United States Patent
Okubo et al.

(10) Patent No.: US 9,932,021 B2
(45) Date of Patent: Apr. 3, 2018

(54) VEHICLE COLLISION PREVENTION APPARATUS

(71) Applicant: Mitsubishi Electric Corporation, Tokyo (JP)

(72) Inventors: Yoichi Okubo, Tokyo (JP); Akinobu Sugiyama, Tokyo (JP); Atsushi Yoshikawa, Tokyo (JP); Masataka Shirozono, Tokyo (JP); Nobutaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 96 days.

(21) Appl. No.: 15/230,576

(22) Filed: Aug. 8, 2016

(65) Prior Publication Data
US 2017/0129466 A1 May 11, 2017

(30) Foreign Application Priority Data

Nov. 5, 2015 (JP) ................................. 2015-217323

(51) Int. Cl.
*B60T 7/12* (2006.01)
*B60Q 1/44* (2006.01)
(Continued)

(52) U.S. Cl.
CPC .................. *B60T 7/12* (2013.01); *B60Q 1/44* (2013.01); *B60T 7/22* (2013.01); *B60T 17/22* (2013.01); *B60T 2201/022* (2013.01)

(58) Field of Classification Search
CPC ... B60T 7/12; B60T 17/22; B60T 7/22; B60T 2201/022; B60Q 1/44
See application file for complete search history.

(56) References Cited

U.S. PATENT DOCUMENTS

| 6,278,360 B1* | 8/2001 | Yanagi | B60Q 1/525 180/281 |
| 2007/0168129 A1* | 7/2007 | Thorne | B60Q 1/525 701/301 |

(Continued)

FOREIGN PATENT DOCUMENTS

| JP | 10-338110 A | 12/1998 |
| JP | 2007-296978 A | 11/2007 |

(Continued)

OTHER PUBLICATIONS

Communication dated Oct. 4, 2016 from the Japanese Patent Office in counterpart Application No. 2015-217323.

*Primary Examiner* — Dale Moyer

(74) *Attorney, Agent, or Firm* — Sughrue Mion, PLLC; Richard C. Turner

(57) ABSTRACT

When a following vehicle approaches a host vehicle, a following vehicle warning unit that issues a warning to the following vehicle on the basis of the likelihood of a front end collision, calculated by a front end collision likelihood calculation unit and the likelihood of a rear end collision, calculated by a rear end collision likelihood calculation unit, issues a warning to the following vehicle before activating a brake apparatus of the host vehicle at a brake force determined by a braking processing determination unit that determines a brake force required to prevent a collision between the host vehicle and a frontward obstruction on the basis of the likelihood of a front end collision.

13 Claims, 5 Drawing Sheets

(51) Int. Cl.
*B60T 7/22* (2006.01)
*B60T 17/22* (2006.01)

(56) References Cited

U.S. PATENT DOCUMENTS

2008/0312834 A1* 12/2008 Noda ................. B60T 7/22
  701/301
2009/0018740 A1* 1/2009 Noda ................. B60T 7/22
  701/70

FOREIGN PATENT DOCUMENTS

JP  2009-18721 A  1/2009
JP  4709360 B2  6/2011

* cited by examiner

VEHICLE COLLISION PREVENTION APPARATUS

BACKGROUND OF THE INVENTION

1. Field of the Invention

This invention relates to a vehicle collision prevention apparatus that activates an automatic brake on the basis of the likelihood of a collision between a host vehicle and a frontward obstruction.

2. Description of the Related Art

An automatic brake apparatus has been put to practical use as a conventional apparatus that both reduces the likelihood of a collision between a host vehicle and a frontward obstruction in front of the host vehicle and reduces damage inflicted during a collision with the frontward obstruction by evaluating the likelihood of a collision between the host vehicle and the frontward obstruction on the basis of output from a distance measurement sensor provided in the vehicle, and executing at least one of outputting a warning to a driver and increasing a brake force as collision prevention processing when the likelihood of a collision is high.

Further, a control device for a brake apparatus that reduces the likelihood of a rear end collision between a host vehicle and a following vehicle by reducing or limiting an increased brake force when the danger of a collision from the rear is detected in a condition where an automatic brake is activated during vehicle travel in order to prevent a collision with a frontward obstruction has been proposed in the prior art (see Japanese Patent Publication No. 4709360, for example).

In a recommended design for the automatic brake apparatus, deceleration is not started until the host vehicle reaches the vicinity of a limit point at which a collision can be prevented, and at the limit point, a brake operation is performed such that a high degree of deceleration is obtained. In so doing, a situation in which the driver of the vehicle becomes overly dependent on the apparatus so as to use the automatic brake habitually can be prevented (see "Technical guidelines for brake apparatuses used to mitigate low speed collisions with frontward obstructions", Attachment 5-2 of "Technical Guidelines for Automobiles" in Kokujigi No. 44, issued by the Ministry of Land Infrastructure and Transport, Road Transport Bureau, Engineering and Safety Department, May 22, 2009).

SUMMARY OF THE INVENTION

However, the prior art includes the following problem.

When the technical guidelines described in "Technical guidelines for brake apparatuses used to mitigate low speed collisions with frontward obstructions" are applied to the control device for a brake apparatus described in Japanese Patent Publication No. 4709360, a design having little leeway must be applied to reduction or limitation of the brake force.

Therefore, when the brake force is reduced or limited by the control device for a brake apparatus described in Japanese Patent Publication No. 4709360 in order to reduce the likelihood of a rear end collision with a following vehicle, it may be impossible to reduce the likelihood of a collision with a frontward obstruction and reduce the damage inflicted during a collision with the frontward obstruction.

This invention has been designed to solve the problem described above, and an object thereof is to obtain a vehicle collision prevention apparatus that is capable of reducing the likelihood of a rear end collision with a following vehicle and reducing damage inflicted during a rear end collision with the following vehicle while reducing the likelihood of a collision with a frontward obstruction and reducing damage inflicted during a collision with the frontward obstruction.

A vehicle collision prevention apparatus according to this invention includes a frontward obstruction detection unit that detects a frontward obstruction by monitoring a space in front of a host vehicle, a front end collision likelihood calculation unit that calculates a likelihood of a collision between the host vehicle and the frontward obstruction on the basis of the presence of the frontward obstruction, detected by the frontward obstruction detection unit, and at least one of a distance, a relative velocity, and a relative acceleration between the host vehicle and the frontward obstruction, a following vehicle detection unit that detects a following vehicle by monitoring a space behind the host vehicle, a rear end collision likelihood calculation unit that calculates a likelihood of a collision between the host vehicle and the following vehicle on the basis of the presence of the following vehicle, detected by the following vehicle detection unit, and at least one of a distance, a relative velocity, and a relative acceleration between the host vehicle and the following vehicle, a braking processing determination unit that determines a brake force for preventing a collision between the host vehicle and the frontward obstruction on the basis of the likelihood of a front end collision, calculated by the front end collision likelihood calculation unit, and a following vehicle warning unit that issues a warning to the following vehicle on the basis of the likelihood of a front end collision and the likelihood of a rear end collision, calculated by the rear end collision likelihood calculation unit, wherein, when the following vehicle approaches the host vehicle, the following vehicle warning unit issues a warning to the following vehicle before activating a brake apparatus of the host vehicle at the brake force determined by the braking processing determination unit.

With the vehicle collision prevention apparatus according to this invention, when the following vehicle approaches the host vehicle, the following vehicle warning unit that issues a warning to the following vehicle on the basis of the likelihood of a front end collision, calculated by the front end collision likelihood calculation unit and the likelihood of a rear end collision, calculated by the rear end collision likelihood calculation unit, issues a warning to the following vehicle before activating the brake apparatus of the host vehicle at the brake force determined by the braking processing determination unit that determines the brake force required to prevent a collision between the host vehicle and the frontward obstruction on the basis of the likelihood of a front end collision.

As a result, the likelihood of a rear end collision with the following vehicle and damage inflicted during a rear end collision with the following vehicle can be reduced while reducing the likelihood of a collision with the frontward obstruction and damage inflicted during a collision with the frontward obstruction.

DESCRIPTION OF THE PREFERRED EMBODIMENTS

Figure 1:
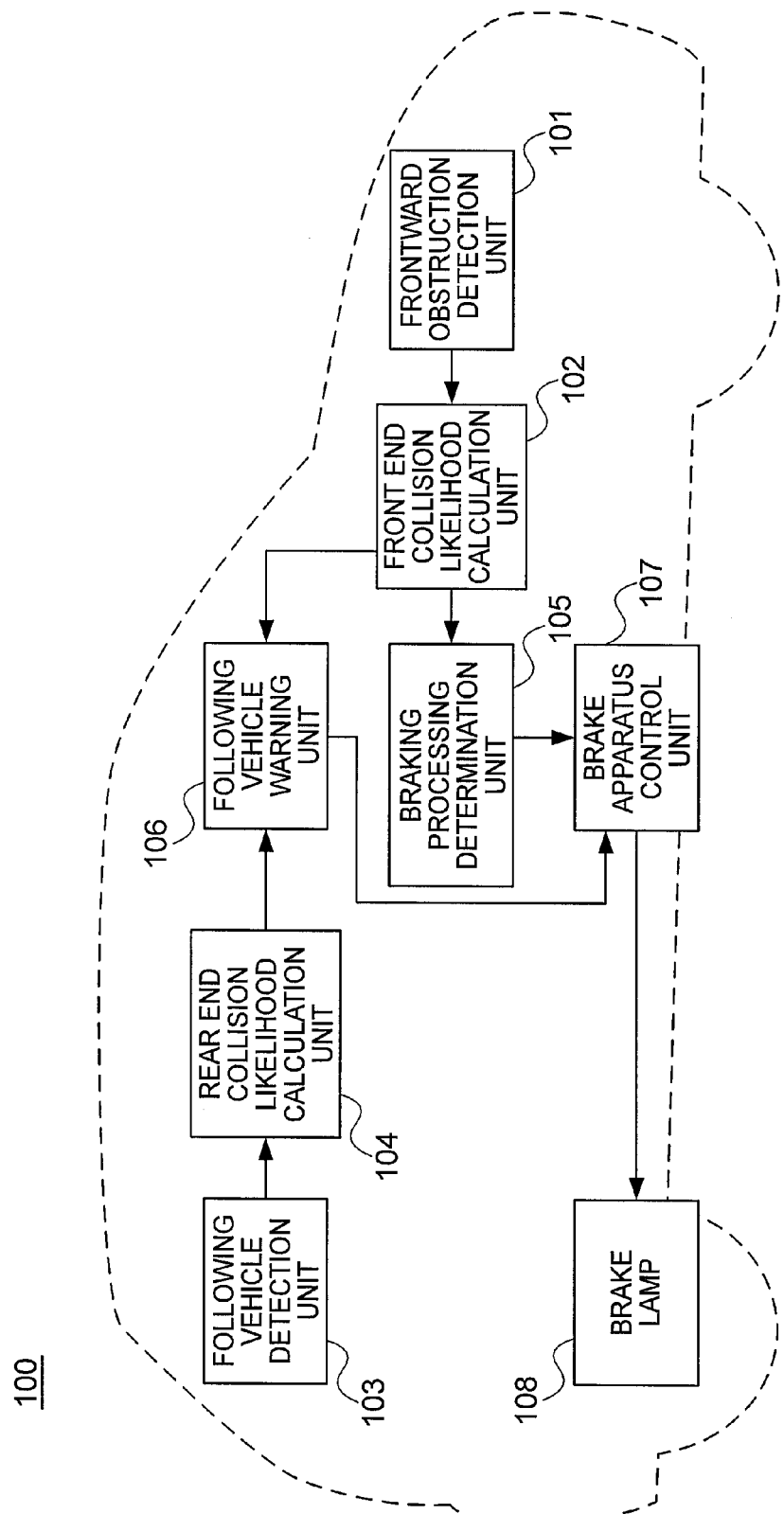
FIG. 1 is a block diagram showing a configuration of a vehicle collision prevention apparatus according to a first embodiment of this invention.

Preferred embodiments of a vehicle collision prevention apparatus according to this invention will be described below using the drawings. Identical or corresponding parts of the drawings will be described using identical reference numerals.

First Embodiment

FIG. 1 is a block diagram showing a configuration of a vehicle collision prevention apparatus according to a first embodiment of this invention. In FIG. 1, a vehicle collision prevention apparatus 100 includes a frontward obstruction detection unit 101, a front end collision likelihood calculation unit 102, a following vehicle detection unit 103, a rear end collision likelihood calculation unit 104, a braking processing determination unit 105, a following vehicle warning unit 106, a brake apparatus control unit 107, and a brake lamp 108.

The frontward obstruction detection unit 101 includes a sensing device that monitors a space in front of a host vehicle. A monocular camera, a stereo camera, a millimeter wave radar, or the like may be used as the sensing device, and to secure redundancy, a plurality of different types of sensors may be used simultaneously.

Further, as a method of transmitting information relating to a frontward obstruction, measured by the frontward obstruction detection unit 101, to the front end collision likelihood calculation unit 102, output from the sensing device is converted into a code indicating the presence of a frontward obstruction, a distance between the host vehicle and the frontward obstruction, the direction, size, shape, and type of the frontward obstruction, and so on by performing calculation processing in the interior of the frontward obstruction detection unit 101, whereupon the code is transmitted to the front end collision likelihood calculation unit 102 over a network line. Note that the output from the sensing device may be transmitted to the front end collision likelihood calculation unit 102 as is over a signal line.

The front end collision likelihood calculation unit 102 receives the information output from the frontward obstruction detection unit 101 indicating the presence of a frontward obstruction, the distance from the host vehicle to the frontward obstruction, the direction, size, shape, and type of the frontward obstruction, and so on, calculates the likelihood of a collision between the host vehicle and the frontward obstruction from the received values on the basis of the presence of a frontward obstruction and at least one of the distance, a relative velocity, and a relative acceleration between the host vehicle and the frontward obstruction, and outputs the likelihood of a front end collision in the form of a numerical value.

Figure 2:
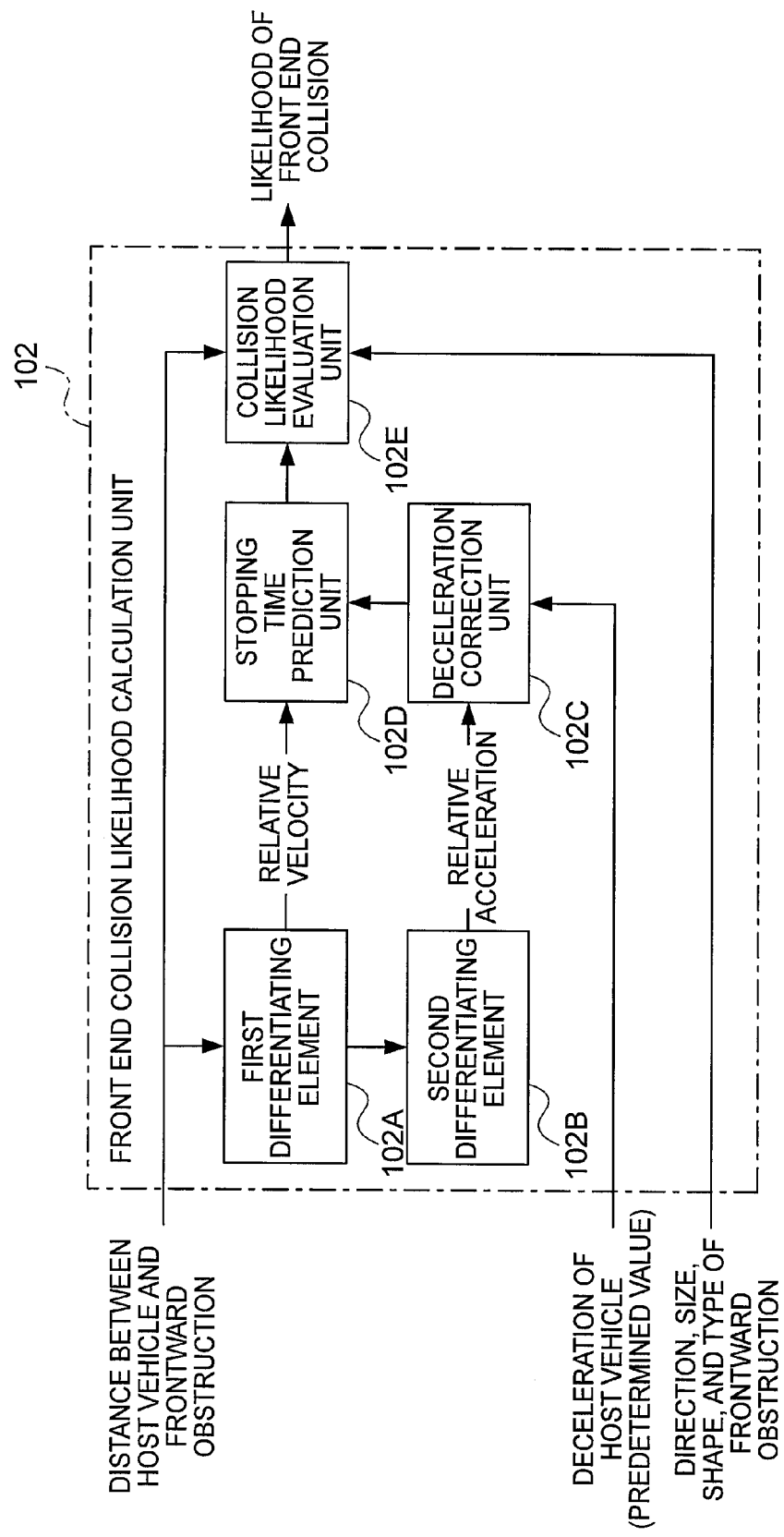
FIG. 2 is a block diagram showing a configuration of a front end collision likelihood calculation unit provided in the vehicle collision prevention apparatus according to the first embodiment of this invention.

An example of the content of the calculations executed by the front end collision likelihood calculation unit 102 will now be described with reference to FIG. 2. FIG. 2 is a block diagram showing a configuration of the front end collision likelihood calculation unit provided in the vehicle collision prevention apparatus according to the first embodiment of this invention. In FIG. 2, the front end collision likelihood calculation unit 102 includes a first differentiating element 102A, a second differentiating element 102B, a deceleration correction unit 102C, a stopping time prediction unit 102D, and a collision likelihood evaluation unit 102E.

The first differentiating element 102A outputs the relative velocity between the host vehicle and the frontward obstruction by differentiating the distance between the host vehicle and the frontward obstruction once. The second differentiating element 102B outputs the relative acceleration between the host vehicle and the frontward obstruction by differentiating the relative velocity between the host vehicle and the frontward obstruction once, or in other words differentiating the distance between the host vehicle and the frontward obstruction twice. The deceleration correction unit 102C corrects a deceleration of the host vehicle on the basis of the relative acceleration between the host vehicle and the frontward obstruction.

Here, the deceleration correction unit 102C corrects the deceleration of the host vehicle, which is a predetermined value determined in accordance with the specifications of the host vehicle, by performing an integration operation on the deceleration of the host vehicle using a lookup table or an approximation indicating a relationship between a deceleration correction amount and the relative acceleration between the host vehicle and the frontward obstruction, for example. The stopping time prediction unit 102D calculates a predicted stopping time required for the relative velocity between the host vehicle and the frontward obstruction to reach zero on the basis of the relative velocity between the host vehicle and the frontward obstruction and the deceleration of the host vehicle.

Here, the relative velocity between the host vehicle and the frontward obstruction does not have to be calculated by the first differentiating element 102A, and instead, a value calculated by a sensor capable of calculating the relative velocity directly or a value transmitted using other means such as communication may be used. Further, the deceleration correction unit 102C does not have to be used, and instead, the stopping time prediction unit 102D may calculate the stopping time by means of a simple algebra operation using the predetermined value of the deceleration of the host vehicle.

The collision likelihood evaluation unit 102E evaluates the likelihood of a collision on the basis of the distance between the host vehicle and the frontward obstruction and the predicted stopping time calculated by the stopping time prediction unit 102D. In the evaluation, the distance between the host vehicle and the frontward obstruction may simply be compared with a distance traveled by the host vehicle following the elapse of the predicted stopping time. Alternatively, a probability distribution may be assigned in accordance with the magnitude of the difference between the two distances, and the probability distribution may be corrected in consideration of the direction, size, shape, and type of the frontward obstruction.

The following vehicle detection unit 103 includes a sensing device that monitors a space behind the host vehicle. A monocular camera, a stereo camera, a millimeter wave radar, or the like may be used as the sensing device, and to secure redundancy, a plurality of different types of sensors may be used simultaneously.

Further, as a method of transmitting information relating to a following vehicle, measured by the following vehicle detection unit 103, to the rear end collision likelihood calculation unit 104, output from the sensing device is converted into a code indicating the presence of a following vehicle, a distance between the host vehicle and the following vehicle, the direction, size, shape, and type of the following vehicle, and so on by performing calculation processing in the interior of the following vehicle detection unit 103, whereupon the code is transmitted to the rear end collision likelihood calculation unit 104 over a network line. Note that the output from the sensing device may be transmitted to the rear end collision likelihood calculation unit 104 as is over a signal line.

The rear end collision likelihood calculation unit 104 receives the information output from the following vehicle detection unit 103 indicating the presence of a following vehicle, the distance from the host vehicle to the following vehicle, the direction, size, shape, and type of the following vehicle, and so on, calculates the likelihood of a collision between the host vehicle and the following vehicle from the received values on the basis of the presence of a following vehicle and at least one of the distance, a relative velocity, and a relative acceleration between the host vehicle and the following vehicle, and outputs the likelihood of a rear end collision in the form of a numerical value. Note that the content of the calculations executed by the rear end collision likelihood calculation unit 104 is similar to the content of the calculations executed by the front end collision likelihood calculation unit 102.

The braking processing determination unit 105 monitors the numerical value indicating the likelihood of a front end collision, calculated by the front end collision likelihood calculation unit 102, and activates a brake apparatus, not shown in the drawing, by outputting a brake force instruction value to the brake apparatus control unit 107 to prevent a collision between the host vehicle and the frontward obstruction. The braking processing determination unit 105 performs a similar operation to the conventional automatic brake apparatus described above.

The following vehicle warning unit 106 sets a front side first threshold relating to the start of an evaluation of the likelihood of a collision between the host vehicle and a following vehicle and a front side second threshold relating to the start of a brake operation for preventing a collision between the host vehicle and a frontward obstruction with respect to the numerical value indicating the likelihood of a front end collision, calculated by the front end collision likelihood calculation unit 102. Note that the front side second threshold takes a larger value than the front side first threshold.

Further, the following vehicle warning unit 106 sets a rear side first threshold relating to the start of an evaluation of the likelihood of a collision between the host vehicle and a following vehicle and a rear side second threshold relating to processing for preventing a collision between the host vehicle and the following vehicle with respect to the numerical value indicating the likelihood of a rear end collision, calculated by the rear end collision likelihood calculation unit 104. Note that the rear side second threshold takes a larger value than the rear side first threshold.

In accordance with the respective thresholds, the following vehicle warning unit 106 determines an operation with which to reduce the likelihood of a collision between the host vehicle and the following vehicle while keeping the likelihood of a collision between the host vehicle and the frontward obstruction at a minimum, and outputs a brake force instruction value or the like, for example, to the brake apparatus control unit 107 in order to activate the brake apparatus.

Here, examples of the content of the calculations executed by the following vehicle warning unit 106 will be described. In a first example, first, when the frontward obstruction detection unit 101 detects a frontward obstruction and the likelihood of a front end collision, calculated by the front end collision likelihood calculation unit 102, is determined to be no lower than the front side first threshold but lower than the front side second threshold, the following vehicle warning unit 106 searches for a following vehicle.

Next, when the likelihood of a rear end collision, calculated by the rear end collision likelihood calculation unit 104, is determined to be no lower than the rear side first threshold but lower than the rear side second threshold, the following vehicle warning unit 106 activates the automatic brake in order to generate a brake force that serves as a warning to the following vehicle. In so doing, the vehicle-to-vehicle distance between the host vehicle and the following vehicle is reduced, thereby alerting the following vehicle, and as a result, the likelihood of a collision between the host vehicle and the following vehicle can be reduced.

In a second example, first, when the frontward obstruction detection unit 101 detects a frontward obstruction and the likelihood of a front end collision, calculated by the front end collision likelihood calculation unit 102, is determined to be no lower than the front side first threshold but lower than the front side second threshold, the following vehicle warning unit 106 searches for a following vehicle.

Next, when the likelihood of a rear end collision, calculated by the rear end collision likelihood calculation unit 104, is determined to equal or exceed the rear side second threshold, the following vehicle warning unit 106 determines that the risk of a collision with the following vehicle is high, and alerts the following vehicle either by simply illuminating the brake lamp 108 or by generating a weak brake force such that the brake lamp 108 of the host vehicle is illuminated but substantially no deceleration effect is obtained. In so doing, the following vehicle can be alerted without reducing the vehicle-to-vehicle distance between the host vehicle and the following vehicle, and as a result, the likelihood of a collision between the host vehicle and the following vehicle can be reduced.

Note that at this time, at least one of the front side first threshold, the front side second threshold, the rear side first threshold, and the rear side second threshold may be varied in consideration of the directions, sizes, shapes, and types of the frontward obstruction and the following vehicle, output respectively by the frontward obstruction detection unit 101 and the following vehicle detection 103.

The brake apparatus control unit 107 controls the brake apparatus using the larger of the brake force instruction value output by the braking processing determination unit 105 and the brake force instruction value output by the following vehicle warning unit 106 as a brake force instruction value. Further, when the brake force instruction value exceeds a prescribed value, the brake apparatus control unit 107 illuminates the brake lamp 108.

Figure 3:
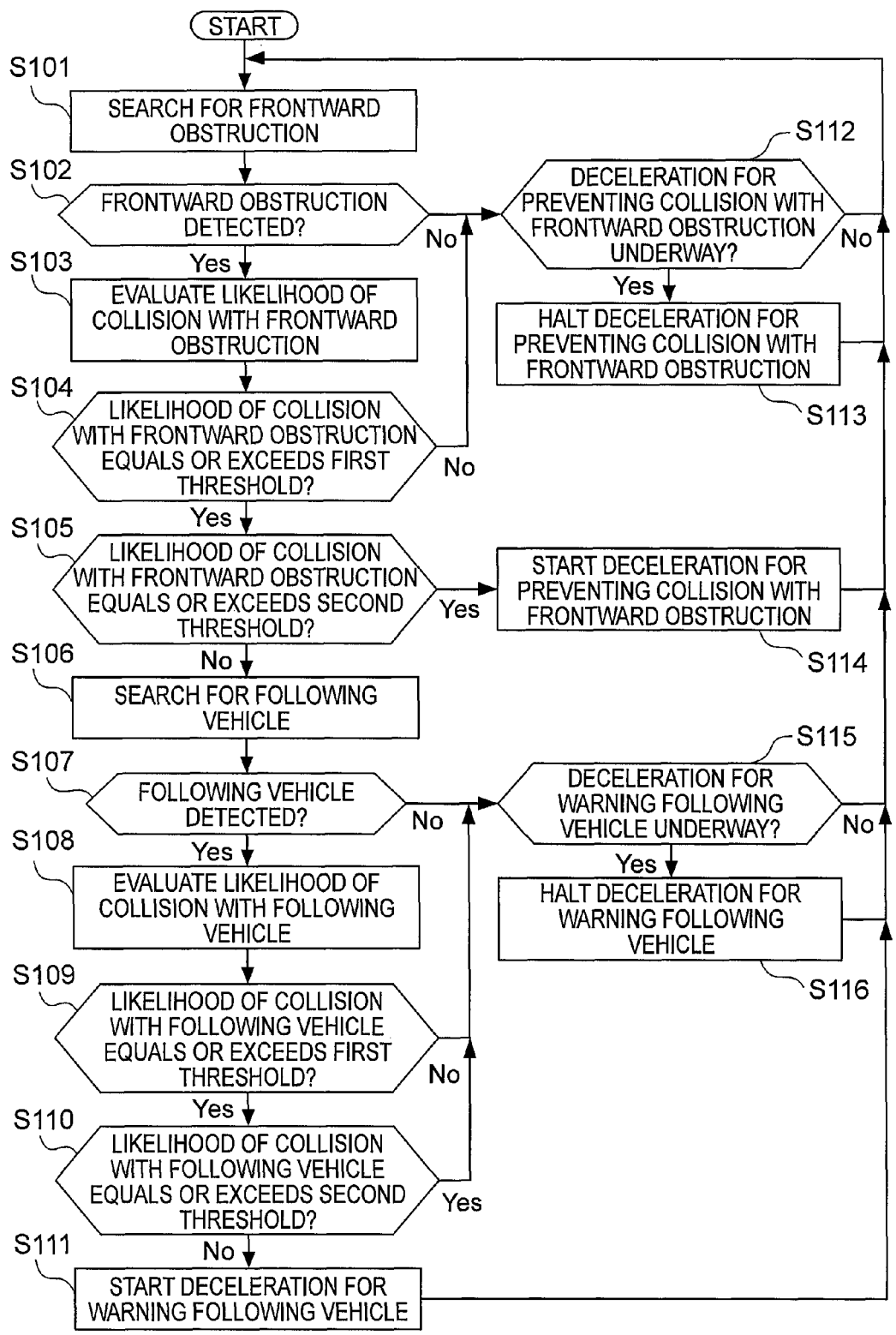
FIG. 3 is a flowchart showing processing executed by the vehicle collision prevention apparatus according to the first embodiment of this invention.

Processing executed by the vehicle collision prevention apparatus according to the first embodiment of this invention will now be described with reference to a flowchart shown in FIG. 3. Note that this flowchart is started upon activation of the vehicle or the like.

First, the frontward obstruction detection unit 101 searches ahead of the host vehicle for a frontward obstruction such as a stopped vehicle existing in front of the host vehicle (step S101).

Next, the frontward obstruction detection unit 101 determines whether or not a frontward obstruction has been detected (step S102).

When it is determined in step S102 that a frontward obstruction has been detected (i.e. Yes), the front end collision likelihood calculation unit 102 evaluates the likelihood of a collision with the frontward obstruction on the basis of the information relating to the frontward obstruction, measured by the frontward obstruction detection unit 101, and outputs the likelihood of a front end collision to the following vehicle warning unit 106 (step S103).

Next, the following vehicle warning unit 106 determines whether or not the likelihood of a front end collision equals or exceeds the front side first threshold (step S104).

When it is determined in step S104 that the likelihood of a front end collision equals or exceeds the front side first threshold (i.e. Yes), the following vehicle warning unit 106 determines whether or not the likelihood of a front end collision equals or exceeds the front side second threshold (step S105).

When it is determined in step S105 that the likelihood of a front end collision is lower than the front side second threshold (i.e. No), the following vehicle detection unit 103 searches behind the host vehicle for a following vehicle existing behind the host vehicle (step S106).

Next, the following vehicle detection unit 103 determines whether or not a following vehicle has been detected (step S107).

When it is determined in step S107 that a following vehicle has been detected (i.e. Yes), the rear end collision likelihood calculation unit 104 evaluates the likelihood of a collision with the following vehicle on the basis of the information relating to the following vehicle, measured by the following vehicle detection unit 103, and outputs the likelihood of a rear end collision to the following vehicle warning unit 106 (step S108).

Next, the following vehicle warning unit 106 determines whether or not the likelihood of a rear end collision equals or exceeds the rear side first threshold (step S109).

When it is determined in step S109 that the likelihood of a rear end collision equals or exceeds the rear side first threshold (i.e. Yes), the following vehicle warning unit 106 determines whether or not the likelihood of a rear end collision equals or exceeds the rear side second threshold (step S110).

When it is determined in step S110 that the likelihood of a rear end collision is lower than the rear side second threshold (i.e. No), the following vehicle warning unit 106 increases the brake force in order to start decelerating the host vehicle as a warning to the following vehicle (step S111), whereupon the routine advances to step S101.

When, on the other hand, it is determined in step S102 that a frontward obstruction has not been detected (i.e. No) or it is determined in step S104 that the likelihood of a front end collision is lower than the front side first threshold (i.e. No), the braking processing determination unit 105 determines whether or not deceleration for preventing a collision with the frontward obstruction is underway (step S112).

When it is determined in step S112 that deceleration for preventing a collision with the frontward obstruction is underway (i.e. Yes), the braking processing determination unit 105 halts the deceleration for preventing a collision with the frontward obstruction (step S113), whereupon the routine advances to step S101.

When, on the other hand, it is determined in step S112 that deceleration for preventing a collision with the frontward obstruction is not underway (i.e. No), the routine advances to step S101 as is.

Meanwhile, when it is determined in step S105 that the likelihood of a front end collision equals or exceeds the front side second threshold (i.e. Yes), the braking processing determination unit 105 starts to decelerate the host vehicle with the aim of preventing a collision with the frontward obstruction (step S114), whereupon the routine advances to step S101.

When, on the other hand, it is determined in step S107 that a following vehicle has not been detected (i.e. No), or it is determined in step S109 that the likelihood of a rear end collision is lower than the rear side first threshold (i.e. No), or it is determined in step S110 that the likelihood of a rear end collision equals or exceeds the rear side second threshold (i.e. Yes), the following vehicle warning unit 106 determines whether or not deceleration for warning the following vehicle is underway (step S115).

When it is determined in step S115 that deceleration for warning the following vehicle is underway (i.e. Yes), the following vehicle warning unit 106 halts the deceleration for warning the following vehicle (step S116), whereupon the routine advances to step S101.

When, on the other hand, it is determined in step S115 that deceleration for warning a following vehicle is not underway (i.e. No), the routine advances to step S101 as is.

At this time, in the frontward obstruction detection unit 101, the front end collision likelihood calculation unit 102, and the following vehicle warning unit 106, the space in front of the host vehicle continues to be searched even after deceleration for warning the following vehicle is started in step S111, and when a frontward obstruction is detected, the likelihood of a collision with the frontward obstruction is evaluated (steps S101 to S105).

Then, in the following vehicle detection unit 103, the rear end collision likelihood calculation unit 104, and the following vehicle warning unit 106, the space behind the host vehicle is searched after determining that the likelihood of a front end collision is lower than the front side second threshold, and when a following vehicle is detected again, the likelihood of a collision with the following vehicle is evaluated (steps S106 to S110).

Here, when the host vehicle is decelerated with the aim of warning the following vehicle such that the following vehicle decelerates, leading to an increase in the vehicle-to-vehicle distance between the host vehicle and the following vehicle, the following vehicle warning unit 106 checks the braking condition at that time, and having determined that deceleration for warning the following vehicle is underway (Yes in step S115), halts the deceleration for warning the following vehicle (step S116).

By evaluating the likelihood of a collision between the host vehicle and a following vehicle while simultaneously evaluating the likelihood of a collision between the host vehicle and a frontward obstruction in this manner, the brake lamp 108 can be illuminated or a brake operation can be performed as a warning to the following vehicle before performing a braking operation to prevent the collision between the host vehicle and the frontward obstruction, and as a result, both the likelihood of a collision between the host vehicle and the frontward obstruction and the likelihood of a collision between the host vehicle and the following vehicle can be reduced.

According to the first embodiment, as described above, when a following vehicle approaches the host vehicle, the following vehicle warning unit that issues a warning to the following vehicle on the basis of the likelihood of a front end collision, calculated by the front end collision likelihood calculation unit and the likelihood of a rear end collision, calculated by the rear end collision likelihood calculation unit, issues a warning to the following vehicle before activating the brake apparatus of the host vehicle at the brake force determined by the braking processing determination unit that determines the brake force required to prevent a collision between the host vehicle and a frontward obstruction on the basis of the likelihood of a front end collision.

As a result, the likelihood of a rear end collision with the following vehicle and damage inflicted during a rear end collision with the following vehicle can be reduced while reducing the likelihood of a collision with the frontward obstruction and damage inflicted during a collision with the frontward obstruction.

Second Embodiment

Figure 4:
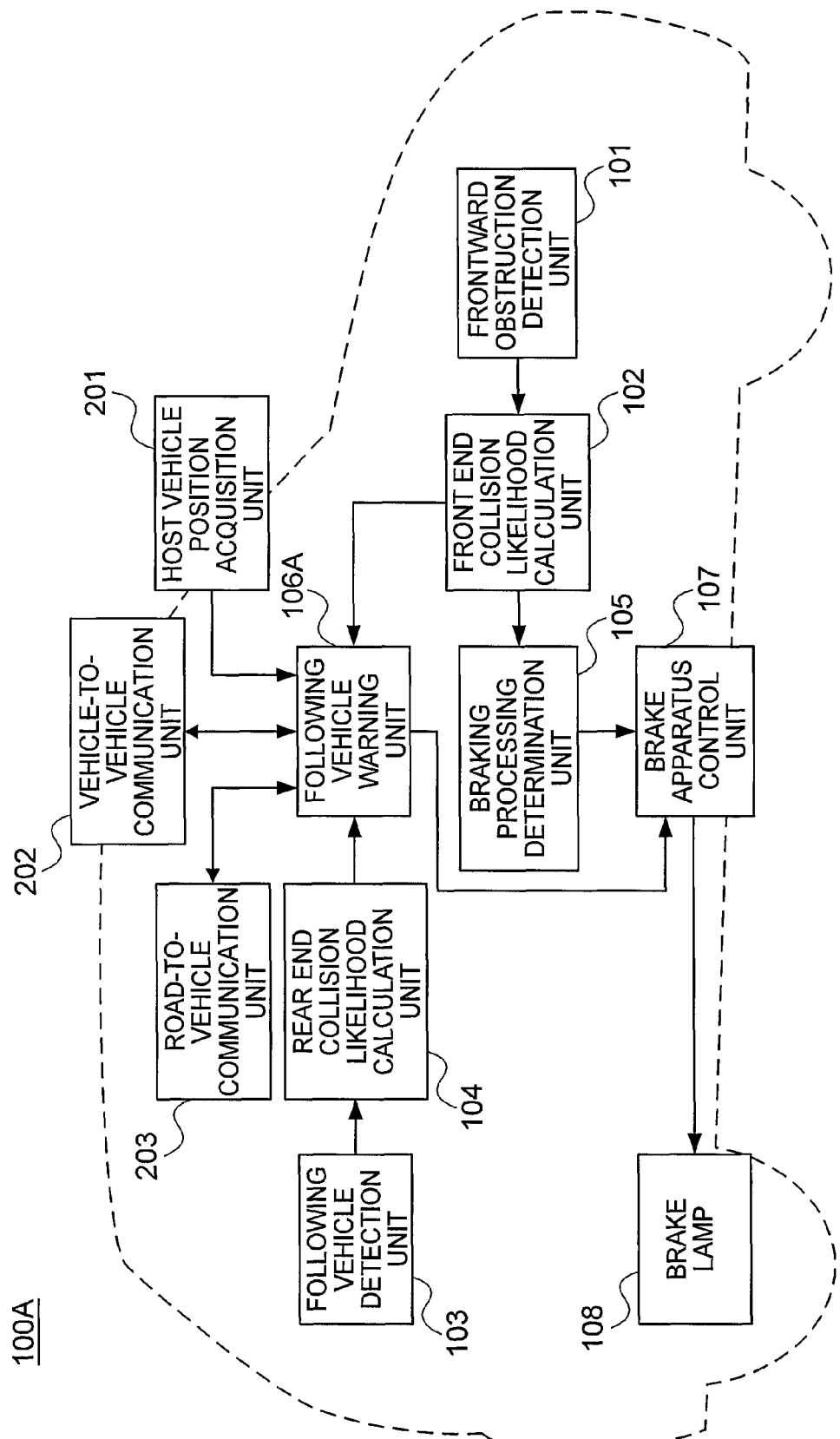
FIG. 4 is a block diagram showing a configuration of a vehicle collision prevention apparatus according to a second embodiment of this invention.

FIG. 4 is a block diagram showing a configuration of a vehicle collision prevention apparatus according to a second embodiment of this invention. In FIG. 4, a vehicle collision prevention apparatus 100A includes a host vehicle position acquisition unit 201, a vehicle-to-vehicle communication unit 202, and a road-to-vehicle communication unit 203 in addition to the configuration of the vehicle collision prevention apparatus 100 shown in FIG. 1.

Further, the vehicle collision prevention apparatus 100A includes a following vehicle warning unit 106A in place of the following vehicle warning unit 106 shown in FIG. 1. All other configurations are identical to those of the first embodiment, and therefore description thereof has been omitted.

The host vehicle position acquisition unit 201 acquires information relating to the position of the host vehicle from a satellite navigation system such as a quasi-zenith satellite or a GPS (Global Positioning System) satellite.

The vehicle-to-vehicle communication unit 202 is communication means such as a vehicle-to-vehicle communication device for exchanging vehicle information with a peripheral vehicle. The road-to-vehicle communication unit 203 may be a roadside device, for example, constituted by an infrastructure server such as a VICS (Vehicle Information and Communication System) (registered trademark). Note that as long as messages and vehicle control information such as a speed and a brake force can be exchanged with a peripheral vehicle during travel, there are no particular limitations on the means therefor.

Here, when a message or vehicle control information is transmitted to a following vehicle via the vehicle-to-vehicle communication unit 202 and the road-to-vehicle communication unit 203, the following vehicle must be specified. Hence, the following vehicle to which the message or the vehicle control information is to be transmitted can be specified by comparing the information indicating the position of the host vehicle, acquired by the host vehicle position acquisition unit 201, with information indicating the position of the following vehicle, acquired via the vehicle-to-vehicle communication unit 202 and the road-to-vehicle communication unit 203, and calculating the relative positions of the two vehicles.

The following vehicle warning unit 106A sets the front side first threshold relating to the start of an evaluation of the likelihood of a collision between the host vehicle and a following vehicle and the front side second threshold relating to the start of a brake operation for preventing a collision between the host vehicle and a frontward obstruction with respect to the numerical value indicating the likelihood of a front end collision, calculated by the front end collision likelihood calculation unit 102. Note that the front side second threshold takes a larger value than the front side first threshold.

Further, the following vehicle warning unit 106A sets the rear side first threshold relating to the start of an evaluation of the likelihood of a collision between the host vehicle and a following vehicle and the rear side second threshold relating to processing for preventing a collision between the host vehicle and the following vehicle with respect to the numerical value indicating the likelihood of a rear end collision, calculated by the rear end collision likelihood calculation unit 104. Note that the rear side second threshold takes a larger value than the rear side first threshold.

In accordance with the respective thresholds, the following vehicle warning unit 106A determines the operation with which to reduce the likelihood of a collision between the host vehicle and the following vehicle while keeping the likelihood of a collision between the host vehicle and a frontward obstruction at a minimum, and outputs the brake force instruction value or the like, for example, to the brake apparatus control unit 107 in order to activate the brake apparatus.

Furthermore, at this time, the following vehicle warning unit 106A may transmit a message warning of the danger of a collision between the host vehicle and a frontward obstruction to the following vehicle via the vehicle-to-vehicle communication unit 202 or the road-to-vehicle communication unit 203, or transmit a command requesting immediate activation of the brake to the following vehicle.

Here, examples of the content of the calculations executed by the following vehicle warning unit 106A will be described. In a first example, first, when the frontward obstruction detection unit 101 detects a frontward obstruction and the likelihood of a front end collision, calculated by the front end collision likelihood calculation unit 102, is determined to be no lower than the front side first threshold but lower than the front side second threshold, the following vehicle warning unit 106A searches for a following vehicle.

Next, when the likelihood of a rear end collision, calculated by the rear end collision likelihood calculation unit 104, is determined to be no lower than the rear side first threshold but lower than the rear side second threshold, the following vehicle warning unit 106A activates the automatic brake in order to generate a brake force that serves as a warning to the following vehicle. In so doing, the vehicle-to-vehicle distance between the host vehicle and the following vehicle is reduced, thereby alerting the following vehicle, and as a result, the likelihood of a collision between the host vehicle and the following vehicle can be reduced.

In a second example, first, when the frontward obstruction detection unit 101 detects a frontward obstruction and the likelihood of a front end collision, calculated by the front end collision likelihood calculation unit 102, is determined to be no lower than the front side first threshold but lower than the front side second threshold, the following vehicle warning unit 106A searches for a following vehicle.

Next, when the likelihood of a rear end collision, calculated by the rear end collision likelihood calculation unit 104, is determined to equal or exceed the rear side second threshold, the following vehicle warning unit 106A determines that the risk of a collision with the following vehicle is high, and transmits a command requesting immediate activation of the brake to the following vehicle. Thus, the following vehicle can perform a brake operation synchronously with the host vehicle such that the host vehicle can be decelerated while maintaining the vehicle-to-vehicle distance between the host vehicle and the following vehicle, and as a result, the likelihood of a collision between the host vehicle and the following vehicle can be reduced.

Figure 5:
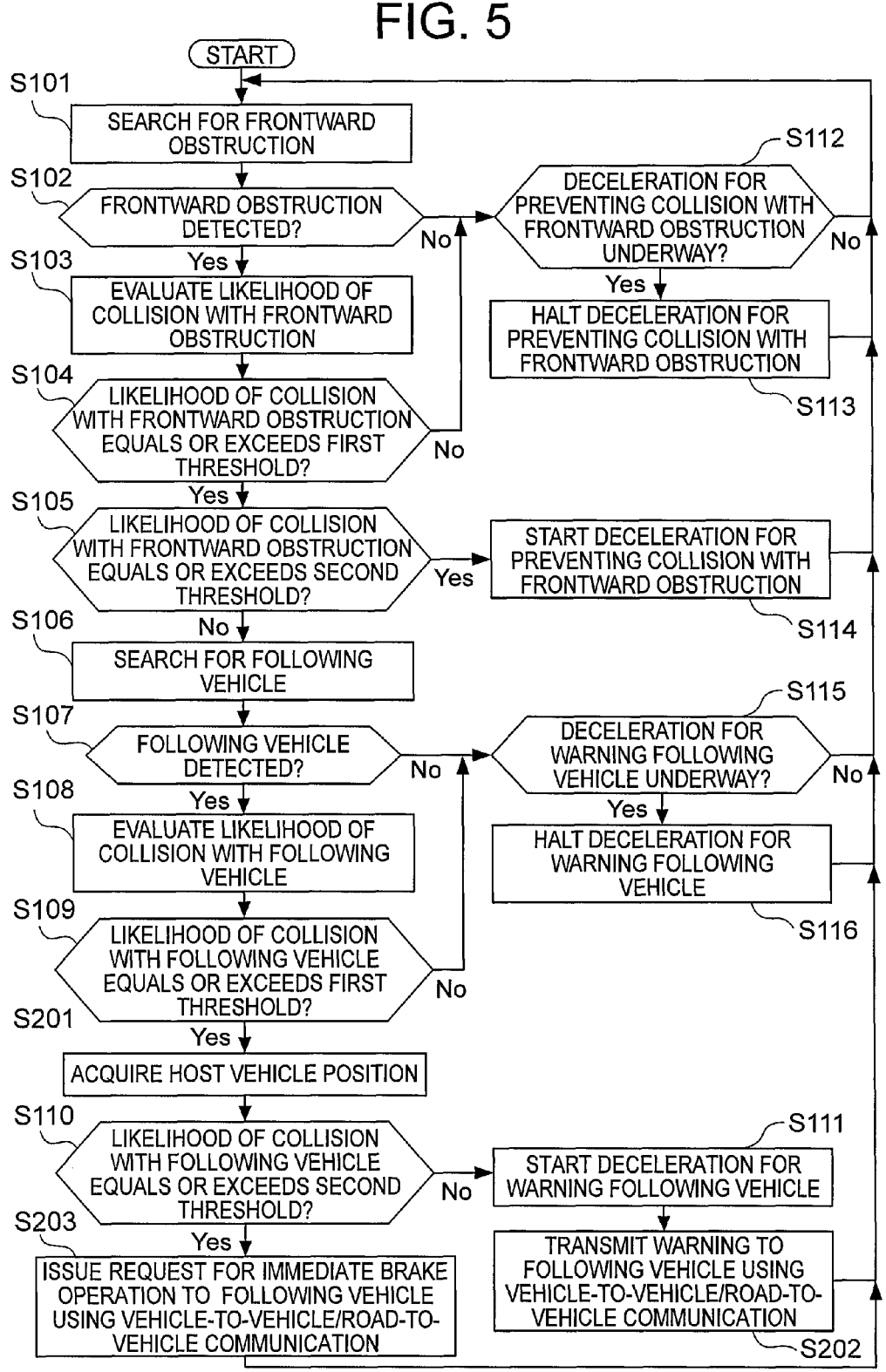
FIG. 5 is a flowchart showing processing executed by the vehicle collision prevention apparatus according to the second embodiment of this invention.

Processing executed by the vehicle collision prevention apparatus according to the second embodiment of this invention will now be described with reference to a flowchart shown in FIG. 5. Note that this flowchart is started upon activation of the vehicle or the like. Here, operations other than those of steps S201 to S203 are identical to the first embodiment, and therefore description of steps S101 to S105 and steps S112 to S114 has been omitted.

When it is determined in step S105 that the likelihood of a front end collision is lower than the front side second threshold (i.e. No), the following vehicle detection unit 103 searches behind the host vehicle for a following vehicle existing behind the host vehicle (step S106).

Next, the following vehicle detection unit 103 determines whether or not a following vehicle has been detected (step S107).

When it is determined in step S107 that a following vehicle has been detected (i.e. Yes), the rear end collision likelihood calculation unit 104 evaluates the likelihood of a collision with the following vehicle on the basis of the information relating to the following vehicle, measured by the following vehicle detection unit 103, and outputs the likelihood of a rear end collision to the following vehicle warning unit 106A (step S108).

Next, the following vehicle warning unit 106A determines whether or not the likelihood of a rear end collision equals or exceeds the rear side first threshold (step S109).

When it is determined in step S109 that the likelihood of a rear end collision equals or exceeds the rear side first threshold (i.e. Yes), the host vehicle position acquisition unit 201 acquires information relating to the position of the host vehicle (step S201).

Next, the following vehicle warning unit 106A determines whether or not the likelihood of a rear end collision equals or exceeds the rear side second threshold (step S110).

When it is determined in step S110 that the likelihood of a rear end collision is lower than the rear side second threshold (i.e. No), the following vehicle warning unit 106A increases the brake force in order to start decelerating the host vehicle as a warning to the following vehicle (step S111).

Next, the following vehicle warning unit 106A transmits a message warning of the danger of a collision between the host vehicle and a frontward obstruction to the following vehicle via the vehicle-to-vehicle communication unit 202 and the road-to-vehicle communication unit 203 (step S202), whereupon the routine advances to step S101.

When, on the other hand, it is determined in step S110 that the likelihood of a rear end collision equals or exceeds the rear side second threshold (i.e. Yes), the following vehicle warning unit 106A transmits a command requesting immediate activation of the brake to the following vehicle via the vehicle-to-vehicle communication unit 202 and the road-to-vehicle communication unit 203 (step S203), whereupon the routine advances to step S101.

Meanwhile, when it is determined in step S107 that a following vehicle has not been detected (i.e. No) or it is determined in step S109 that the likelihood of a rear end collision is lower than the rear side first threshold (i.e. No), the following vehicle warning unit 106A determines whether or not deceleration for warning a following vehicle is underway (step S115).

When it is determined in step S115 that deceleration for warning the following vehicle is underway (i.e. Yes), the following vehicle warning unit 106A halts the deceleration for warning the following vehicle (step S116), whereupon the routine advances to step S101.

When, on the other hand, it is determined in step S115 that deceleration for warning the following vehicle is not underway (i.e. No), the routine advances to step S101 as is.

Here, when the host vehicle is decelerated with the aim of warning the following vehicle such that the following vehicle decelerates, leading to an increase in the vehicle-to-vehicle distance between the host vehicle and the following vehicle, the following vehicle warning unit 106A checks the braking condition at that time, and having determined that deceleration for warning the following vehicle is underway (Yes in step S115), halts the deceleration for warning the following vehicle (step S116).

By evaluating the likelihood of a collision between the host vehicle and a following vehicle while simultaneously evaluating the likelihood of a collision between the host vehicle and a frontward obstruction in this manner, a brake operation can be performed as a warning to the following vehicle and either a warning message or a command requesting immediate activation of the brake can be transmitted to the following vehicle before performing a braking operation to prevent the collision between the host vehicle and the frontward obstruction, and as a result, both the likelihood of a collision between the host vehicle and the frontward obstruction and the likelihood of a collision between the host vehicle and the following vehicle can be reduced.

According to the second embodiment, as described above, similarly to the first embodiment, when a following vehicle approaches the host vehicle, the following vehicle warning unit that issues a warning to the following vehicle on the basis of the likelihood of a front end collision, calculated by the front end collision likelihood calculation unit and the likelihood of a rear end collision, calculated by the rear end collision likelihood calculation unit, issues a warning to the following vehicle before activating the brake apparatus of the host vehicle at the brake force determined by the braking processing determination unit that determines the brake force required to prevent a collision between the host vehicle and a frontward obstruction on the basis of the likelihood of a front end collision.

As a result, the likelihood of a rear end collision with the following vehicle and damage inflicted during a rear end collision with the following vehicle can be reduced while reducing the likelihood of a collision with the frontward obstruction and damage inflicted during a collision with the frontward obstruction.

What is claimed is:
1. A vehicle collision prevention apparatus comprising:
a frontward obstruction detection unit that detects a frontward obstruction by monitoring a space in front of a host vehicle;
a front end collision likelihood calculation unit that calculates a likelihood of a collision between the host vehicle and the frontward obstruction on the basis of the presence of the frontward obstruction, detected by the frontward obstruction detection unit, and at least one of a distance, a relative velocity, and a relative acceleration between the host vehicle and the frontward obstruction;
a following vehicle detection unit that detects a following vehicle by monitoring a space behind the host vehicle;
a rear end collision likelihood calculation unit that calculates a likelihood of a collision between the host vehicle and the following vehicle on the basis of the presence of the following vehicle, detected by the following vehicle detection unit, and at least one of a distance, a relative velocity, and a relative acceleration between the host vehicle and the following vehicle;
a braking processing determination unit that determines a brake force for preventing a collision between the host vehicle and the frontward obstruction on the basis of the likelihood of a front end collision, calculated by the front end collision likelihood calculation unit; and
a following vehicle warning unit that issues a warning to the following vehicle on the basis of the likelihood of a front end collision and the likelihood of a rear end collision, calculated by the rear end collision likelihood calculation unit,
wherein, when the following vehicle approaches the host vehicle, the following vehicle warning unit issues a warning to the following vehicle before activating a brake apparatus of the host vehicle at the brake force determined by the braking processing determination unit.

2. The vehicle collision prevention apparatus according to claim 1, wherein the following vehicle warning unit:
sets a front side first threshold relating to the start of an evaluation of the likelihood of a collision between the host vehicle and the following vehicle and a front side second threshold relating to the start of a brake operation for preventing a collision between the host vehicle and the frontward obstruction with respect to the likelihood of a front end collision, the front side second threshold being larger than the front side first threshold;
sets a rear side first threshold relating to the start of the evaluation of the likelihood of a collision between the host vehicle and the following vehicle and a rear side second threshold relating to processing for preventing the collision between the host vehicle and the following vehicle, with respect to the likelihood of a rear end collision, the rear side second threshold being larger than the rear side first threshold; and
notifies the following vehicle that deceleration of the host vehicle has begun on the basis of the likelihood of a rear end collision.

3. The vehicle collision prevention apparatus according to claim 2, wherein the following vehicle warning unit:
searches for the following vehicle when the frontward obstruction detection unit detects the frontward obstruction and the likelihood of a front end collision is determined to be no lower than the front side first threshold but lower than the front side second threshold; and
activates the brake apparatus when the likelihood of a rear end collision is determined to be no lower than the rear side first threshold but lower than the rear side second threshold.

4. The vehicle collision prevention apparatus according to claim 3, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

5. The vehicle collision prevention apparatus according to claim 2, wherein the following vehicle warning unit:
searches for the following vehicle when the frontward obstruction detection unit detects the frontward obstruction and the likelihood of a front end collision is determined to be no lower than the front side first threshold but lower than the front side second threshold; and
illuminates a brake lamp of the host vehicle when the likelihood of a rear end collision is determined to be no lower than the rear side second threshold.

6. The vehicle collision prevention apparatus according to claim 5, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

7. The vehicle collision prevention apparatus according to claim 2, further comprising at least one of a vehicle-to-vehicle communication unit by which vehicle-related information is exchanged between the host vehicle and the following vehicle, and a road-to-vehicle communication unit by which vehicle-related information is exchanged between the host vehicle and the following vehicle via a communication device disposed on a roadside,
wherein the following vehicle warning unit:
searches for the following vehicle when the frontward obstruction detection unit detects the frontward obstruction and the likelihood of a front end collision is determined to be no lower than the front side first threshold but lower than the front side second threshold; and
transmits a message warning of the danger of a collision between the host vehicle and the frontward obstruction to the following vehicle via at least one of the vehicle-to-vehicle communication unit and the road-to-vehicle communication unit when the likelihood of a rear end collision is determined to be no lower than the rear side first threshold but lower than the rear side second threshold.

8. The vehicle collision prevention apparatus according to claim 7, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

9. The vehicle collision prevention apparatus according to claim 2, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

10. The vehicle collision prevention apparatus according to claim 1, wherein the following vehicle warning unit:

sets a front side first threshold relating to the start of an evaluation of the likelihood of a collision between the host vehicle and the following vehicle and a front side second threshold relating to the start of a brake operation for preventing a collision between the host vehicle and the frontward obstruction with respect to the likelihood of a front end collision, the front side second threshold being larger than the front side first threshold;

sets a rear side first threshold relating to the start of the evaluation of the likelihood of a collision between the host vehicle and the following vehicle and a rear side second threshold relating to processing for preventing the collision between the host vehicle and the following vehicle with respect to the likelihood of a rear end collision, the rear side second threshold being larger than the rear side first threshold; and issues a request to the following vehicle to activate a brake immediately on the basis of the likelihood of a rear end collision.

11. The vehicle collision prevention apparatus according to claim 10, further comprising at least one of a vehicle-to-vehicle communication unit by which vehicle-related information is exchanged between the host vehicle and the following vehicle, and a road-to-vehicle communication unit by which vehicle-related information is exchanged between the host vehicle and the following vehicle via a communication device disposed on a roadside, wherein the following vehicle warning unit:

searches for the following vehicle when the frontward obstruction detection unit detects the frontward obstruction and the likelihood of a front end collision is determined to be no lower than the front side first threshold but lower than the front side second threshold; and issues the request to the following vehicle to activate the brake immediately via at least one of the vehicle-to-vehicle communication unit and the road-to-vehicle communication unit when the likelihood of a rear end collision is determined to be no lower than the rear side second threshold.

12. The vehicle collision prevention apparatus according to claim 11, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

13. The vehicle collision prevention apparatus according to claim 10, wherein at least one of the front side first threshold, the front side second threshold, the rear side first threshold, and the rear side second threshold is varied in consideration of directions, sizes, shapes, and types of the frontward obstruction and the following vehicle, the directions, sizes, shapes, and types being output respectively by the frontward obstruction detection unit and the following vehicle detection unit.

* * * * *